US007779354B2

(12) United States Patent
Ashcraft et al.

(10) Patent No.: US 7,779,354 B2
(45) Date of Patent: Aug. 17, 2010

(54) METHOD AND DATA PROCESSING SYSTEM FOR RECOGNIZING AND CORRECTING DYSLEXIA-RELATED SPELLING ERRORS

(75) Inventors: Kenneth Michael Ashcraft, Meadow Vista, CA (US); Viktors Berstis, Austin, TX (US); Erin Christine Burke, Dallas, TX (US); Santhosh Rao, Austin, TX (US); Richard Scott Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1359 days.

(21) Appl. No.: 10/844,637

(22) Filed: May 13, 2004

(65) Prior Publication Data

US 2005/0257146 A1    Nov. 17, 2005

(51) Int. Cl.
*G06F 17/00*    (2006.01)
(52) U.S. Cl. ...................... 715/257; 715/200
(58) Field of Classification Search ................ 715/500, 715/501.1, 533, 257, 200; 705/26; 395/795
See application file for complete search history.

(56) References Cited

U.S. PATENT DOCUMENTS

| 4,940,346 A | | 7/1990 | Liljenquist | 400/487 |
| 5,437,036 A | * | 7/1995 | Stamps et al. | 719/328 |
| 5,604,897 A | * | 2/1997 | Travis | 715/533 |
| 5,649,222 A | * | 7/1997 | Mogilevsky | 715/533 |
| 6,047,300 A | | 4/2000 | Walfish et al. | 715/533 |
| 6,393,444 B1 | * | 5/2002 | Lawrence | 715/533 |
| 6,424,983 B1 | | 7/2002 | Schabes et al. | 715/533 |
| 6,468,084 B1 | | 10/2002 | MacMillan | 434/185 |
| 6,782,510 B1 | * | 8/2004 | Gross et al. | 715/533 |
| 7,032,174 B2 | * | 4/2006 | Montero et al. | 715/533 |
| 2002/0119429 A1 | * | 8/2002 | Barton | 434/178 |
| 2002/0124026 A1 | | 9/2002 | Weber | 715/526 |

OTHER PUBLICATIONS

Technology Overview, Jun. 14, 2004, Dyslexic.com, pp. 1-6.*
John Tytler & Evan Gross, Spell Catcher Plus, 1997, Proximity Technology inc., pp. 1-77.*
Mana Kariman, Manual for Read & Write Gold 6 Software, Jan. 2, 2004, Western Kentucky University, pp. 1-51.*
L&H Kruzweil 3000, 2006, Learnout & Hauspie, pp. 1-3.*
Read & Write Gold for Mac Spell Check, Mar. 29, 2005, TextHelp, pp. 1-3.*
Victoria Hodge & Jim Austin, An Evaluation Of Phonetic Spell Checkers, 2001, CiteSeer, pp. 1-8.*
Alan Duddy, WordSmith 2.0, Feb. 2001, textHELP Systems Ltd, Issue 2, pp. 1-36.*

* cited by examiner

*Primary Examiner*—Stephen S Hong
*Assistant Examiner*—Manglesh M Patel
(74) *Attorney, Agent, or Firm*—Yee & Associates, P.C.; William H. Steinberg

(57) ABSTRACT

A method, computer program product, and a data processing system for recognizing and correcting dyslexia-related spelling errors is provided. A word is received for evaluation of a dyslexia-related misspelling. The received word is compared with a plurality of dyslexia variants, and a match between the received word and a dyslexia variant is identified. An error rate at which dyslexia-related misspelled words are received is compared with a threshold, and the read word is evaluated as one of a correctly spelled word and a dyslexia-related misspelling of a word.

2 Claims, 4 Drawing Sheets

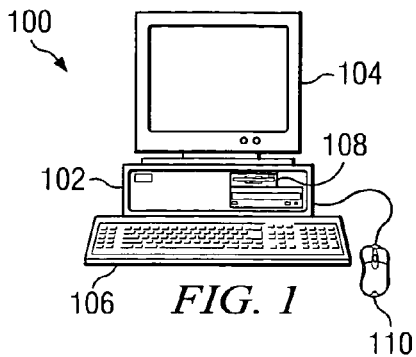
FIG. 1
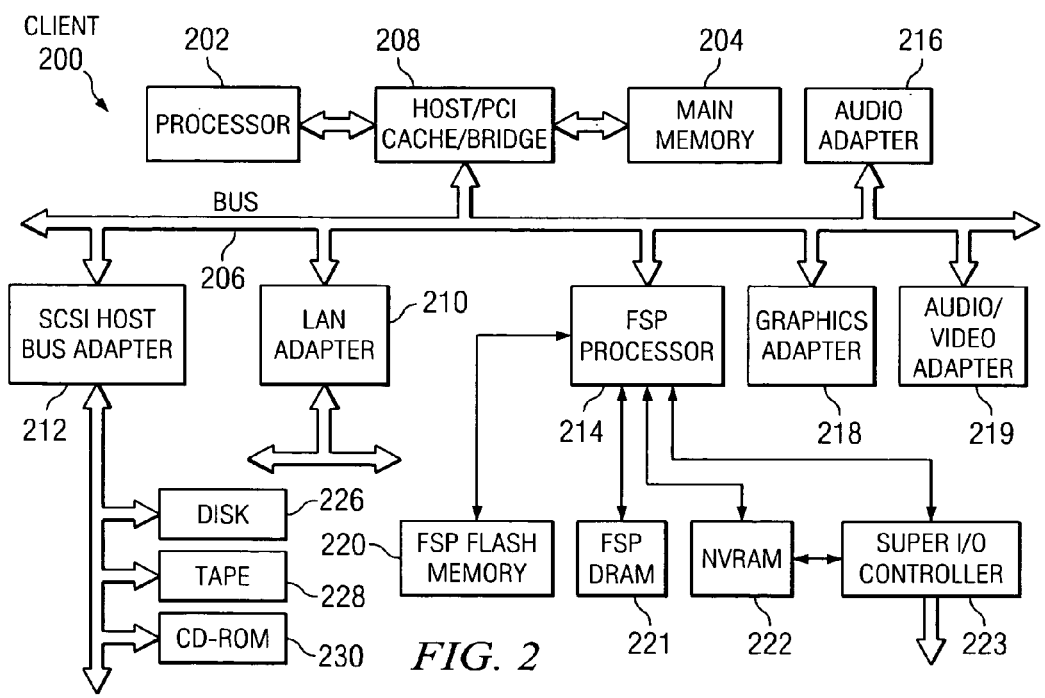
FIG. 2
| User_A | TYPE | ACTIVE | ERRORS | WORDS |
|---|---|---|---|---|
| 510A | PHONETIC | T/F | Errors1 | WORDS |
| 510B | DYSPHONESIA | T/F | Errors2 | WORDS |
| 510C | DYSNEMKINESIA | T/F | Errors3 | WORDS |
FIG. 5

FIG. 3

310 DYS-DYSEI — 330

| | KEY | ERROR1 | ERROR2 | REF | AUDIO |
|---|---|---|---|---|---|
| | 330A | 330B | 330C | 330D | 330E |
| 320A | 01 | ies | is | eyes | eyes.mp3 |
| 320B | 02 | dus | null | does | does.mp3 |
| 320C | 03 | sed | null | said | said.mp3 |
| 320D | 04 | they | null | they | they.mp3 |
| 320E | 05 | psudo | null | pseudo | pseudo.mp3 |
| 320F | 06 | ned | null | need | need.mp3 |
| 320G | 07 | simular | null | similar | similar.mp3 |
| 320H | 08 | eni | eny | any | any.mp3 |
| 320I | 09 | meni | meny | many | many.mp3 |
| 320J | 10 | simbles | null | symbols | symbols.mp3 |

340 DYS-DYSPH — 360

| | KEY | ERROR1 | ERROR2 | REF | AUDIO |
|---|---|---|---|---|---|
| | 360A | 360B | 360C | 360D | 360E |
| 350A | 01 | sad | null | said | said.mp3 |
| 350B | 02 | sybols | null | symbols | symbols.mp3 |
| 350C | 03 | frend | null | friend | friend.mp3 |
| 350D | 04 | solw | null | slow | slow.mp3 |

370 DYS-DYSNE — 390

| | KEY | ERROR1 | ERROR2 | REF | AUDIO |
|---|---|---|---|---|---|
| | 390A | 390B | 390C | 390D | 390E |
| 380A | 01 | subbose | subpose | suppose | suppose.mp3 |
| 380B | 02 | supject | sudject | subject | subject.mp3 |
| 380C | 03 | paber | pader | paper | paper.mp3 |
| 380D | 04 | goob | goop | good | good.mp3 |
| 380E | 05 | bo | po | do | do.mp3 |

METHOD AND DATA PROCESSING SYSTEM FOR RECOGNIZING AND CORRECTING DYSLEXIA-RELATED SPELLING ERRORS

BACKGROUND OF THE INVENTION

1. Technical Field

The present invention relates generally to an improved data processing system and in particular to a data processing system and method for recognizing and correcting dyslexia-related spelling errors. Still more particularly, the present invention provides a data processing system and method for recognizing words input by a user that may be both dyslexia-related misspelled variants of a word or another correctly spelled word.

2. Description of Related Art

Dyslexia is a congenital and developmental condition that causes a disturbance in the use of language. Most often, dyslexia causes diminished abilities in reading, writing, and spelling. Persons with dyslexia tend to make similar characteristic writing errors.

Typical word processing applications have tools for correcting common spelling and grammatical errors. For example, spell-checking utilities in word processing applications use a reference dictionary having correctly spelled word entries with which a word entered into the word processing application is compared. If a match between the entered word and an entry of the reference dictionary is not made, one or more entries with character strings close to the word entered by the user may be suggested to the user as a substitute for the entered word.

Various types of dyslexia, such as dyseidesia and dysphonesia, exist. Characteristic spelling errors result from the particular dyslexia type. For example, phonetic-like spelling errors are characteristic of a word misspelling provided by a person having dyseidesia, and misspellings having letter positions reversed in a word are characteristic of a person having dysphonesia.

Spell-checking utilities in typical word processing applications recognize misspelled variants of a word based on, for example, the word length and the constituent letters of the misspelled word. Due to the various types of misspellings that result from the different dyslexia types, conventional spell-checking applications are ineffectively adapted to recognize the variant misspellings that may result from persons with different types of dyslexia. Moreover, some properly spelled words are spelled identically to a dyslexia-related misspelling of another word. Such dyslexia-related misspellings are unrecognizable by conventional spell checking algorithms.

It would be advantageous to provide a spell-checking algorithm that recognizes dyslexia-related misspelled words. It would be further advantageous to provide a spell-checking algorithm that recognizes dyslexia-related misspelled words based on a dyslexia type. Moreover, it would be further advantageous to provide a spell-checking algorithm that recognizes words that, although correctly spelled, may be a dyslexia-related misspelling of another word.

SUMMARY OF THE INVENTION

The present invention provides a method, computer program product, and a data processing system for recognizing and correcting dyslexia-related spelling errors. A word is received for evaluation of a dyslexia-related misspelling. The received word is compared with a plurality of dyslexia variants, and a match between the received word and a dyslexia variant is identified. An error rate at which dyslexia-related misspelled words are received is compared with a threshold, and the received word is evaluated as one of a correctly spelled word and a dyslexia-related misspelling of a word.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system in which the present invention may be implemented in accordance with a preferred embodiment of the present invention;

FIG. 3 is a diagrammatic illustration of dyslexia dictionary comprising tables that contain correctly spelled words and corresponding dyslexia-related misspelled words that facilitate dyslexia recognition and correction in accordance with a preferred embodiment of the present invention;

FIG. 5 is a diagrammatic illustration of a user profile implemented as a table for recording dyslexia-related spelling error counts supplied by a user in accordance with a preferred embodiment of the present invention.

DETAILED DESCRIPTION OF THE PREFERRED EMBODIMENT

Figure 4:
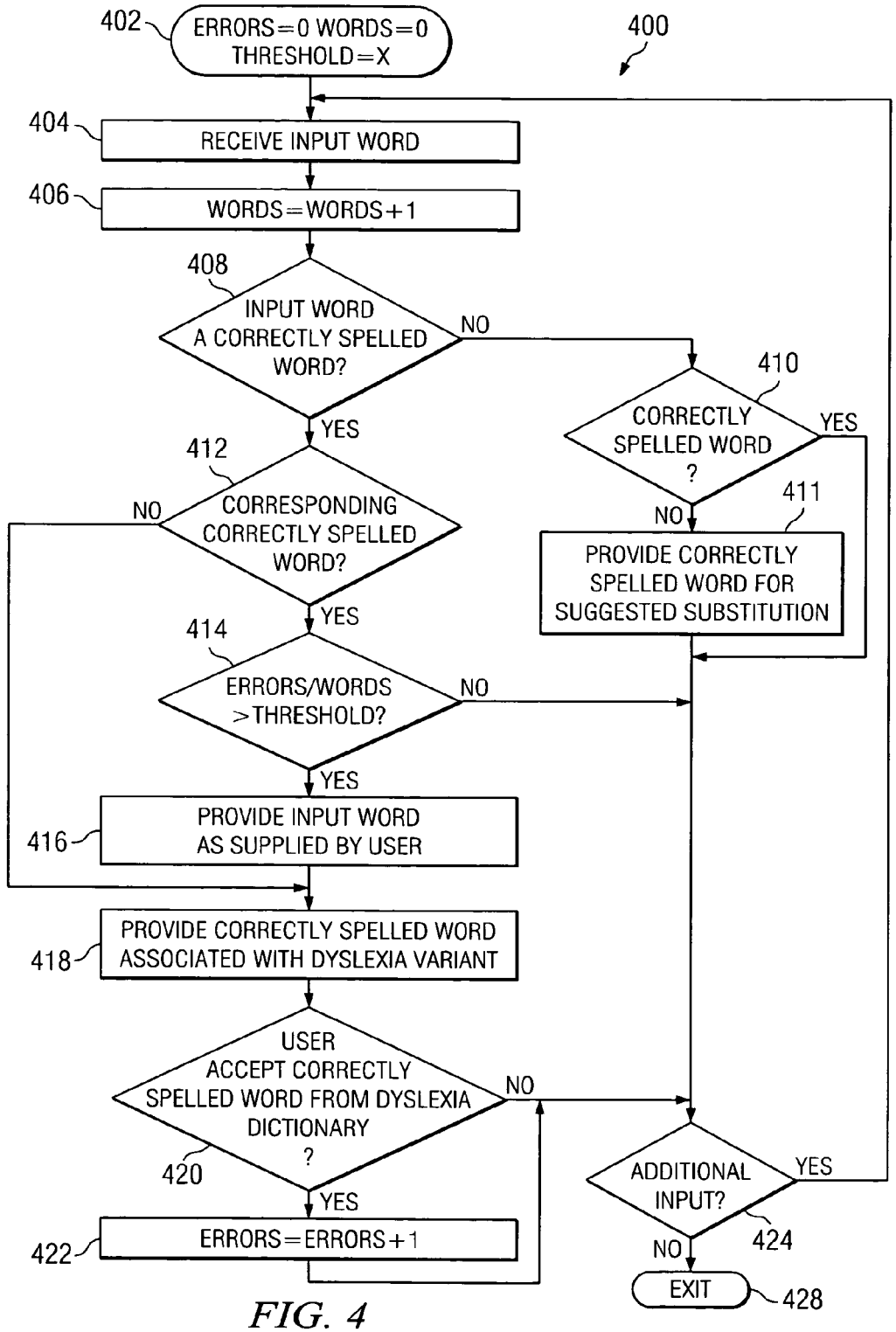
FIG. 4 is a flowchart showing the processing performed by the dyslexia recognition and correction algorithm performed in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

FIG. 3 is a diagrammatic illustration of dyslexia dictionary 300 comprising tables 310, 340 and 370 that contains various correctly spelled words and associated dyslexia-related misspelling of the words (also referred to herein as dyslexia variants) that facilitate dyslexia recognition and correction in accordance with a preferred embodiment of the present invention. Tables 310, 340 and 370 may be stored on disk drive 226, fetched therefrom by processor 202, and processed by data processing system 200 shown in FIG. 2.

Table 310 comprises a plurality of records 320 and fields 330. Each record in records 320A-320J (collectively referred to as records 320), or row, comprises data elements in respective fields 330A-330E. Table 310 has a label, or identifier, assigned thereto. In the present example, table 310 has a label of "DYS_DYSEI." Fields 330A-330E have respective labels, or identifiers, that facilitate insertion, deletion, querying, or other data operations or manipulations of the contents of table 310. In the illustrative example, fields 330A-330E have respective labels of "KEY", "ERROR1", "ERROR2", "REF", and "AUDIO". Data elements of a particular field 330A-330J typically share a common data type, e.g., string, integer, float, etc. A particular field, such as field 330A, may be designated as a key field and each respective data element is unique within key field 330A. Assignment of unique values to data elements of key field 330A provides an identifier for records 320A-320J and the collection of data elements of key field 330A is typically referred to as an index. Addressing a particular record 320A-320J via an associated data element of key field 330A is referred to as indexing of record 320A-320J. Alternatively, a key may be obtained by a function, e.g., a hashing function, that indexes a particular record 320A-320J.

In the illustrative example, records 320A-320J have a unique integer value of 01-10, respectively. Each record 320A-320J has a respective dyslexia variant stored as a string value in field 330B. Some records, for example record 320A, have an additional dyslexia variant stored as a string value in field 330C. Other records, for example record 320C, have a null value (NULL) stored in field 320C. Each of records 320A-320J have a correctly spelled word stored as a string value in field 330D. The correctly spelled word of field 330D is the correct spelling for the associated dyslexia variant stored in field 330B or 330C of the same record. Each record may have an audio file, or a reference to an audio file such as an address, hyperlink, or the like, stored in field 330E. In the illustrative example, an MPEG-1 audio layer 3 (.mp3) formatted file label is stored in field 330E. Each file referenced by respective labels stored in field 330E of records 320 is an audio file of a correct enunciation of the correctly spelled word stored in field 330D.

In a similar manner, table 340 has records 350A-350D (collectively referred to as records 350) having data elements stored in respective fields 360A-360E. Table 340 has a label of DYS_DYSPH, and fields 360A-360E have respective labels of KEY, ERROR1, ERROR2, REF and AUDIO. Field 360A stores integer key values, and dyslexia variants are stored in field 360B or 360C. A correctly spelled word corresponding to one or more of the dyslexia variants of fields 360B or 360C is maintained in field 360D. An audio file, or a reference thereto, is stored in field 360E. Likewise, table 370 having a label of DYS_DYSNE has records 380 with data elements stored in respective fields 390A-390E. Fields 390A-390E have respective labels of KEY, ERROR1, ERROR2, REF, and AUDIO. Dyslexia variants are stored in one or more of fields 390B and 390C, and correctly spelled words associated with the dyslexia variants of fields 390B and 390C are stored in field 390D. An audio file, or a reference thereto, is stored in field 390E.

Dyslexia variants may be classified by one or more of various characteristic spelling error types. For example, one type of common dyslexia-related misspellings is classified as dyseidesia. Dysedesia-related spelling errors are characterized by phonetic errors. Such spelling errors are characterized by phonetic, or phonetic-like, syllable substitution in a word. In the illustrative example, table 310 stores dyslexia variants, and associated correct word spellings, that may be attributed to dyseidesia. For example, record 320A of table DYS_DYSEI contains two phonetic-like misspellings of the word "eyes" correctly spelled in field 330D of record 320A. Particularly, field 330B of record 320A contains the dyslexia variant "ies", and field 330C contains the dyslexia variant "is." Each dyslexia variant stored in fields 330B and 330C of record 320A is characteristic of a misspelling of the correctly spelled word "eyes" resulting from dyseidesia.

Another type of dyslexia referred to as dysphonesia often results in non-phonetic spelling errors. Dysphonesia is typified by a user's inability to syllabicate a word. Dysphonesia is sometimes recognized by a mis-ordering of a word's constituent letters. In the illustrative example, table 340 having label DYS_DYSPH stores dyslexia variants, and associated correct word spellings, that may be attributed to dysphonesia. For example, record 350D contains a dysphonesia-related misspelling of "solw" in field 330B for the correctly spelled word "slow" stored in field 330D.

Yet another type of dyslexia referred to as dysnemkinesia involves a dysfunction involved in letter formation. Dysnemkinesia-related spelling errors are typically characterized by letter reversal. For example, the letter "d" is often erroneously substituted for the letter "b" or "p", or vice versa, by persons afflicted with dysnemkinesia. In the illustrative example, table 370 having label DYS_DYSNE stores dysnemkinesia-related misspelled words, and associated correctly spelled words, that may be attributed to dysnemkinesia. For example, record 380D contains dysnemkinesia-related misspelling of "goob" and "goop" in respective fields 330B and 330C for the correctly spelled word "good" identified in field 330D.

Other dyslexic types may result from an individual having more than one of the dyslexia types described above. The present invention provides an improved technique for automatically recognizing spelling errors based on dyslexia-related spelling error characteristics.

Some dyslexia-related misspelled words are identical to another correctly spelled word. For example, a dysphonesia-related misspelling of "said" is the dyslexia variant "sad". However, the dyslexia variant "sad" is itself a correctly spelled word. Conventional spell-checking utilities may not recognize a dyslexia variant as a misspelled word if the dyslexia variant is a proper spelling of another word. Moreover, users may find it annoying to have alternative words suggested when the user has entered a correctly spelled word without a conventional or dyslexia-related misspelling. For instance, a non-dyslexic user having correctly spelled the word "is" may find it irritating to be prompted with a suggested spelling of "eyes" for each instance of the word "is" in a document being spell checked. The present invention improves conventional spell-checking utilities by recognizing dyslexia-related misspelled words that are identical to other correctly spelled words. A correctly spelled word associated with a dyslexia variant is provided to the user only if the user enters dyslexia-related misspelled words at a rate in excess of a predefined threshold.

The dyslexia recognition and correction algorithm is implemented as a computer-readable set of logic instructions executed by a processor, such as processor 202 of data processing system 200. The dyslexia recognition and correction algorithm evaluates a word supplied by a user for the possibility of a dyslexia-related spelling error. Upon recognition of a possible dyslexia related spelling error, a correctly spelled word associated with a dyslexia variant matching the word supplied by the user is suggested as an alternative spelling to the user, e.g., displayed in a graphical user interface on display terminal 104 shown in FIG. 1, if the user enters dyslexia-related misspelled words at a rate in excess of a predefined threshold.

FIG. 4 is a flowchart 400 showing the processing performed by the dyslexia recognition and correction algorithm performed in accordance with a preferred embodiment of the present invention. The dyslexia recognition and correction algorithm is invoked and one or more variables may be initialized. In the illustrative example, a variable Errors and a variable Words are each initialized to zero, and a variable Threshold is initialized to X, where X may be a decimal value defining an error rate percentage threshold for evaluating a user's input (step 402). A word input by the user is then supplied to the algorithm (step 404) and the counter variable Words is incremented (step 406).

The algorithm then evaluates the input word for a possible dyslexia-related spelling error (step 408). For example, the input word may be used to interrogate tables 300, 330 or 370 to determine if a dyslexia variant maintained in dyslexia tables 310, 340 or 370 matches the word input by the user. If the word input by the user is not matched with a dyslexia variant, the algorithm proceeds to determine if the word is a correctly spelled word (step 410). For example, the input word may be compared with entries of a reference dictionary having proper word spellings. One or more correctly spelled words identified as potential candidates for the input word may be suggested for substitution if the input word is determined to be misspelled (step 411). If the input word is determined to be a correctly spelled word at step 410, or upon providing the user with a correctly spelled word suggestion at step 411, the algorithm proceeds to determine if additional words have been input for evaluation (step 424).

If, however, the input word is determined to match a dyslexia variant at step 408, the dyslexia recognition and correction algorithm then evaluates the word to determine if the input word is a properly spelled word (step 412). The algorithm proceeds to provide the correctly spelled word associated with the dyslexia variant obtained from interrogation of the dyslexia dictionary (step 418) if the input word is determined to be a misspelled word.

As noted above, the spelling of a dyslexia variant may match a different correctly spelled word. In the event that the input word matches both a dyslexia variant and a correctly spelled word, the algorithm utilizes a threshold measure to determine whether it is more likely that the user has correctly entered the word or has in fact erroneously entered a dyslexia-related misspelled word. To this end, if the word input by the user matches both a dyslexia-related misspelled word and a correctly spelled word, the algorithm proceeds to compare the rate at which the user has been determined to enter dyslexia-related misspelled words with a predetermined threshold (step 414). In the illustrative example, the variable Errors is a counter variable that accumulates a count of words input by the user that have been confirmed to be dyslexia-related misspelled words, and the variable Words is a counter variable that accumulates a count of the total number of words input by the user. A dyslexia-related error rate is calculated by determining a quotient of the number of errors to the total number of words input by the user. The dyslexia-related error rate is compared to the value Threshold, e.g., a predefined decimal value representative of a threshold percentage value.

If the dyslexia-related error rate is less than the threshold, the algorithm proceeds to poll for additional user input for evaluation (step 424). Alternatively, if the dyslexia-related error rate is determined to exceed the threshold, the algorithm provides both the correctly spelled word as entered by the user (step 416) and the correctly spelled word associated with the dyslexia variant retrieved from dyslexia dictionary 300 for the record having the dyslexia variant that matches the word input (step 418). The user may then select either the correctly spelled word as originally input or may select the correctly spelled word associated with the dyslexia variant (step 420). Alternatively, the algorithm may omit providing the correctly spelled word as supplied by the user, that is the algorithm may skip step 416, and provide only the correctly spelled word associated with the dyslexia variant obtained from the dyslexia dictionary. In either case, accepting the correctly spelled word associated with the dyslexia variant is a confirmation that the input word was a dyslexia-related spelling error, and the variable Errors is accordingly incremented (step 422). Additionally, the dyslexia correction and recognition algorithm may retrieve and playback the audio file stored in the record having the matching dyslexia variant and the associated correctly spelled word upon acceptance of the correctly spelled word at step 420. The algorithm then proceeds to determine whether additional user input remains for evaluation (step 424).

If, however, the user does not accept the correctly spelled word associated with the matching dyslexia variant, the algorithm proceeds directly to determine whether additional user input remains for evaluation. In the event that additional user input remains for evaluation, the algorithm returns to receive the next input word at step 404. Alternatively, the algorithm exits (step 428).

In this manner, the algorithm accumulates a count of confirmed dyslexia-related spelling errors. Advantageously, the algorithm provides a suggested spelling of a word associated with a dyslexia variant when the input word matches both the dyslexia variant and a correctly spelled word only if the user inputs dyslexia-related misspellings at a rate in excess of a threshold. Additionally, a user afflicted with dyslexia that reduces the frequency of dyslexia-related spelling errors may, over time, be provided with less word suggestions retrieved from dyslexia dictionary 300. As the dyslexia-related error rate is reduced below the threshold, evaluation of an input word that matches both a dyslexia variant and a correctly spelled word will not result in the user being prompted to select an alternative spelling of the correctly spelled word obtained from the dyslexia dictionary.

In accordance with another embodiment of the present invention, a user profile is updated according to confirmed dyslexia-related spelling errors supplied by the user. The user profile is retrieved by the dyslexia recognition and correction algorithm and facilitates dyslexia recognition and correction based on a dyslexia type. FIG. 5 is a diagrammatic illustration of a user profile implemented as a table 500 for recording counts of dyslexia-related spelling errors of a user in accordance with a preferred embodiment of the present invention. Table 500 has records 510 with data elements stored in fields 520. Table 500 provides a mechanism for tracking or monitoring dyslexia-related spelling error characteristics of a particular user.

In the particular example, a label of User_A is assigned to table 500. Fields 520A-520E have respective labels of TYPE, ACTIVE, ERRORS, and WORDS. Respective records 510A-510C are allocated for monitoring dyslexia related spelling errors according to a dyslexia type. In the illustrative example, records 510-510C have key values of Dyseidesia, Dysphonesia and Dysnemkinesia in field 520A. Field 520B contains a Boolean value of true (T) or false (F) that indicates whether the associated dyslexia type is activated for the particular user to which the profile of table 500 is assigned. Errors field 520C stores data elements that identify the number of dyslexia-related errors for the dyslexia-type of the particular record. For example, Errors1 is representative of an integer value count of phonetic-like dyslexia errors that may be attributed to dyseidesia. Likewise, field 520D maintains an error count (Errrors2) in record 510B that identifies the number of dyslexia-related spelling errors that may be attributed to dysphonesia. An error count (Errors3) is maintained in field 520C of record 510C that is an integer error count of dyslexia-related spelling errors that may be attributed to dysnemkinesia. Field 520D stores an integer word count (Words) of the number of words input by the user in field 520D. The error count values maintained in field 520C and the word count maintained in field 520D conjunctively provide a mechanism for determining separate dyslexia-related error rates for the dyslexia types allocated to records 510A-510C.

Figure 6:
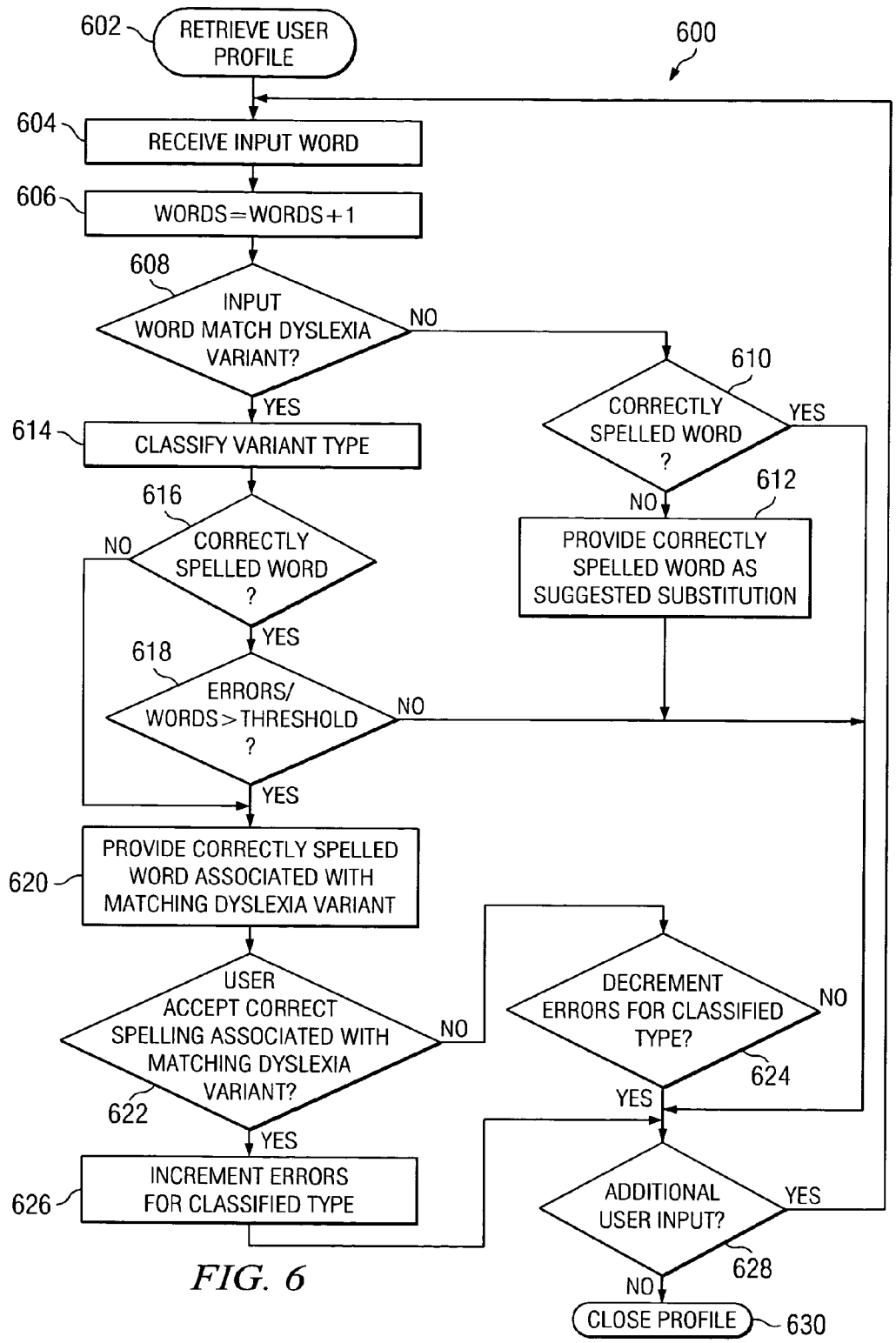
FIG. 6 is a flowchart illustrating processing performed by the dyslexia recognition and correction algorithm in accordance with a preferred embodiment of the present invention.

FIG. 6 is a flowchart 600 illustrating processing performed by the dyslexia recognition and correction algorithm in accordance with a preferred embodiment of the present invention. The dyslexia recognition and correction algorithm retrieves a user profile, such as table 500 described in FIG. 5, of the user supplying the input to be analyzed by the algorithm (step 602). An input word supplied by the user is read by the algorithm (step 604) and the counter variable Words is incremented (step 606).

The input word is then evaluated for a dyslexia-related misspelling characteristic (step 608), for example the input word may be compared with dyslexia variants maintained in dyslexia dictionary 300 of FIG. 3. If the input word does not have a dyslexia-related misspelling characteristic, the algorithm proceeds to determine if the input word is a correctly spelled word (step 610). A correctly spelled word is retrieved from a reference dictionary and provided to the user as a suggested substitution if the input word is determined to be misspelled (step 612). The dyslexia recognition and correction algorithm proceeds to determine if additional user input is to be evaluated (step 628) upon providing a correctly spelled word or if the input word is determined to be correctly spelled.

If the input word is determined to have a dyslexia-related misspelling characteristic at step 608, the dyslexia recognition and correction algorithm proceeds to classify the characteristic dyslexia type (step 614). For example, a dyslexia type may be obtained by the algorithm from the particular table having the dyslexia variant that matches the input word supplied by the user. Alternatively, the dyslexia dictionary may be implemented as a single table having a separate field for each dyslexia variant that defines the dyslexia type associated with a particular dyslexia-related misspelling. In other implementations, the dyslexia recognition and correction algorithm may employ more sophisticated subroutines for evaluating string characteristics for recognizing characteristic phonic errors, letter inversions, or the like for classifying the input word as a particular type of dyslexia-related spelling error.

Upon classifying the input word as a dyslexia type, the dyslexia recognition and correction algorithm determines whether the input word is a correctly spelled word (step 616). The algorithm proceeds to provide the correctly spelled word associated with the matching dyslexia variant (step 620) if the input word is not a correctly spelled word. However, if the input word matches both a dyslexia variant and a correctly spelled word, a dyslexia-related error rate is compared with a threshold (step 618) to determine if a correctly spelled word associated with the dyslexia variant is to be provided as a suggested spelling to the user. In a preferred embodiment, the error rate compared with the threshold is dependent on the dyslexia type classification evaluated for the input word at step 614. For example, assume the input word is determined to match a dyslexia variant spelling and has a dyslexia type of "dysphonesia" assigned at step 614. The dyslexia-related error rate compared with the threshold at step 618 is preferably calculated from the number of dyslexia-related misspellings entered by the user having a dyslexia type of dysphonesia. For example, as dyslexia-related spelling errors are confirmed, the algorithm preferably increments an error count maintained in the user's profile. Thus, error rates can be calculated by determining a quotient of the errors value maintained in field 520C of the record 510A-510C allocated for the particular dyslexia type evaluated for the input word at step 614.

If the dyslexia-related error rate is determined to be less than the threshold at step 618 thereby indicating that the input word has likely been entered correctly, the algorithm proceeds to determine if additional input is available for evaluation. Otherwise, the dyslexia recognition and correction algorithm proceeds to provide the correctly spelled word associated with the matching dyslexia variant (step 620) if the dyslexia-related error rate is greater than the threshold.

After providing the user with a correctly spelled word associated with the dyslexia variant at step 620, the algorithm evaluates whether the user accepts the correctly spelled word associated with the dyslexia-related misspelling (step 622). If the user accepts the correctly spelled word associated with the matching dyslexia variant, the error count maintained in field 520C of the user profile allocated to the dyslexia type of the input word evaluated at step 618 is incremented (step 626). Otherwise, the error type of the user's profile is decremented (step 624).

The algorithm proceeds back to step 604 is additional user input is to be evaluated for dyslexia-related spelling errors. Alternatively, the user profile is closed (step 630).

As described, a method and data processing system for a spell-checking algorithm that recognizes dyslexia-related misspelled words is provide. The dyslexia recognition and correction algorithm recognizes word spellings that may be a dyslexia-related misspelling or a correctly spelled word. In one embodiment, a suggested spelling alternative obtained from a dyslexia dictionary is provided to the user only if the user enters dyslexia-related misspelled words at a rate in excess of a threshold if the input word matches both a dyslexia variant and a correctly spelled word. In another embodiment, the dyslexia recognition and correction algorithm recognizes dyslexia-related misspelled words based on a dyslexia type and determines dyslexia-related misspelling rates based on dyslexia types.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for recognizing and correcting dyslexia-related spelling errors, the method comprising the computer implemented steps of:

receiving a word for evaluation of a dyslexia-related misspelling to form a received word;

comparing the received word with a plurality of dyslexia variants;

identifying a match between the received word and a dyslexia variant in plurality of dyslexia variants;

comparing an error rate at which dyslexia-related misspelled words are received with a threshold; and evaluating the received word as one of a correctly spelled word and a dyslexia-related misspelling of a word, wherein the step of evaluating includes evaluating the received word as the dyslexia-related misspelling of a word, the method further including:

retrieving a profile of a user, wherein the profile of the user includes a count of dyslexia-related misspellings by the user associated with a dyslexia type;

providing a correctly spelled word associated with the dyslexia variant on a display terminal; and responsive to an indication that the received word is not the dyslexia-related misspelling of a word, decrementing the count in the profile of the user associated with the dyslexia type of the dyslexia-related misspelling.

2. A computer program product stored in a computer readable recordable-type medium for recognizing and correcting dyslexia-related spelling errors, the computer program product comprising:

first instructions for receiving an input word;

second instructions for maintaining a plurality of dyslexia variants;

third instructions for identifying one of the plurality of dyslexia variants as a match with the input word and, responsive to identifying the input word as a match with both the one of the plurality of dyslexia variants and a correctly spelled word, evaluating whether the input word is a dyslexia-related misspelling by comparison of an error rate and a threshold, wherein the third instructions calculate the error rate from a count of confirmed dyslexia-related misspelled words and a count of input words received by the first instructions, and wherein the third instructions, responsive to identifying the dyslexia variant that matches the input word, classify the input word as one of a plurality of dyslexia types based on the dyslexia variant that matches the input word, wherein the plurality of dyslexia types include dyseidesia, dysphonesia, and dysnemkinesia; and fourth instructions having a respective error count for each of the plurality of dyslexia types, wherein the fourth instructions, responsive to confirmation that the input word is a dyslexia-related misspelling, increment the error count corresponding to the classified dyslexia type.

* * * * *